Nov. 26, 1935. G. A. LYON 2,022,126
BEADED TIRE COVER
Filed May 13, 1933 2 Sheets-Sheet 1
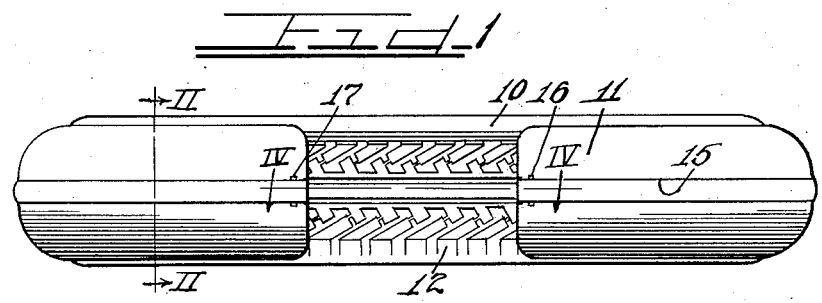
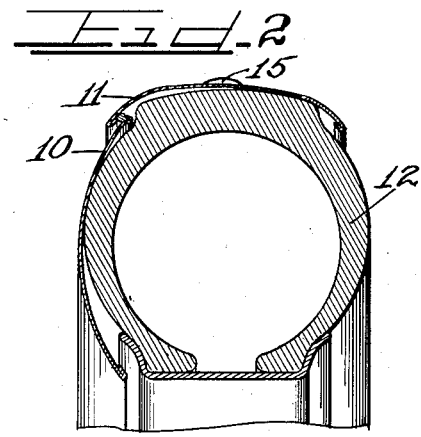
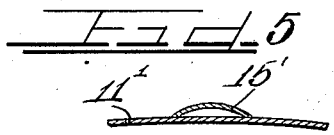
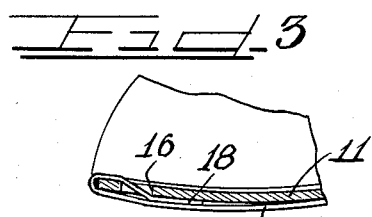
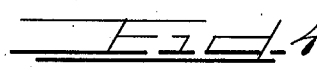
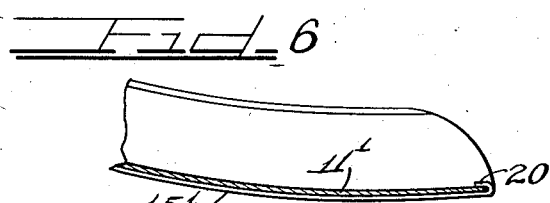
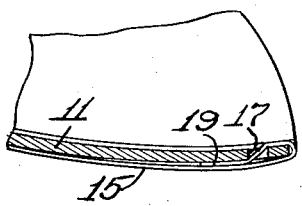
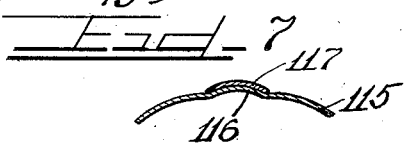
Inventor
George Albert Lyon
by Charles Ix Lieb
Attys.

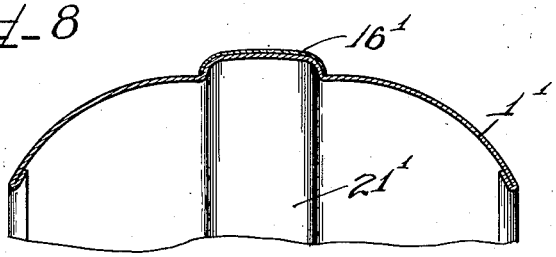
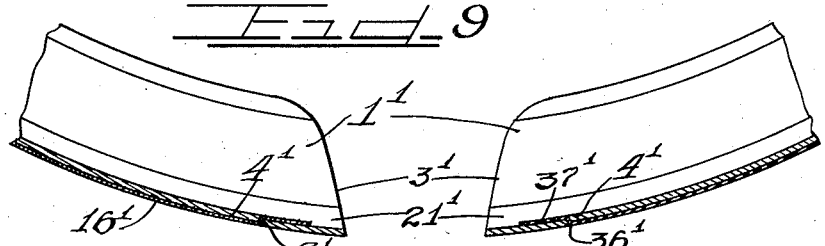
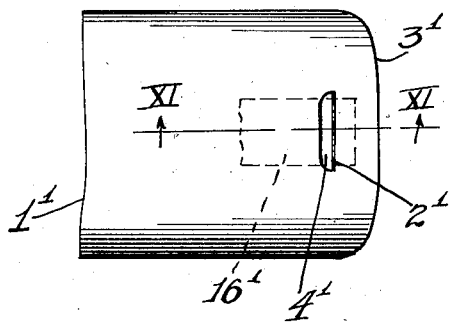
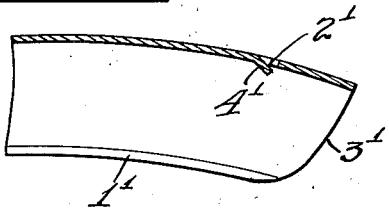
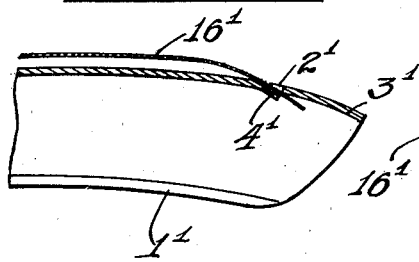
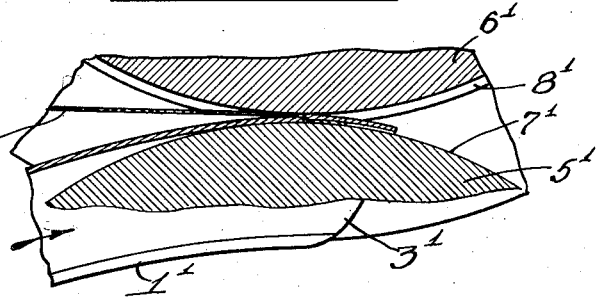

Patented Nov. 26, 1935

2,022,126

UNITED STATES PATENT OFFICE 2,022,126

BEADED TIRE COVER

George Albert Lyon, Allenhurst, N. J., assignor to Lyon Incorporated, Detroit, Mich., a corporation of Delaware Application May 13, 1933, Serial No. 670,881

19 Claims. (Cl. 150—54)

The present invention relates to beaded tire covers and is a continuation in part of each of my copending patent applications Serial No. 543,-335, filed June 10, 1931, issued as Patent No. 1,965,528, July 3, 1934, and Serial No. 576,335, filed November 20, 1931, issued as Patent No. 1,965,533, July 3, 1934, respectively.

An object of the invention is to provide a tire cover having beading secured thereto in a novel, simple and inexpensive manner.

Another object of the invention relates to the provision of novel means for anchoring the ends of a discontinuous circular beading to a spare tire cover member.

In accordance with the features of one form of the invention there is provided a beaded tire cover having disposed on its outer periphery a metallic strip, each end of which is doubled back under the corresponding end of the cover and self-secured to the end of the cover.

In accordance with the features of another form of the invention there is provided a beaded tire cover having disposed on its outer periphery a metallic beading strip each end of which is passed through a slot formed by punching from the cover an anchor portion which during the process of securing the beading to the tire later is pressed into tight engagement with the corresponding end of the strip to wedgingly secure it to the cover.

Both forms of the invention have in common a circular cover beading each end of which is associated with a slot in an end of a split cover part and is positioned so as to be located under the cover part and anchored thereto.

Other objects and features of this invention will more fully appear from the following detail description taken in connection with the accompanying drawings which illustrate several embodiments thereof, and in which Figure 1 is a bottom view of a spare tire cover applied to a tire which cover is provided with beading in accordance with the features of this invention.

Figure 2 is a fragmentary transverse cross-sectional view taken through Figure 1 on the line II—II of Figure 1.

Figures 3 and 4 are enlarged fragmentary sectional views taken on the line IV—IV of Figure 1.

Figures 5 and 6 are fragmentary sectional views illustrating a modification of the invention.

Figure 7 is still another fragmentary sectional view similar to the sectional view of the beading shown in Figure 2 and illustrating a circumferential rib in the cover for supporting the beading.

Figure 8 is an enlarged fragmentary transverse sectional view of a tire cover rim which has been formed with a rib and a strip of beading applied to the rib in accordance with the principles of a still further modification of the invention which is illustrated more fully in the following Figures 9 to 13 inclusive.

Figure 9 is a fragmentary sectional view showing the ends of the tire cover rim illustrated in Figure 8 with the strip of beading attached thereto.

Figure 10 is an enlarged fragmentary view of one end of the tire cover rim illustrating the manner in which the strip of beading is threaded through a slot in the cover rim.

Figure 11 is a fragmentary sectional view taken approximately on the line XI—XI of Figure 10 looking in the direction indicated by the arrows.

Figure 12 is a view similar to Figure 11 but with one end of the strip of beading inserted through the slot adjacent the end of the cover member.

Figure 13 is an enlarged fragmentary sectional view showing how cooperating male and female rolls force the beading into anchored position on the cover rim or member.

At this time I wish to point out that while the present invention has been illustrated in connection with the so-called Lyon multi-part tire cover, the invention is not to be thus limited but only insofar as defined by the scope and spirit of the appended claims.

The cover illustrated in the accompanying drawings is made of two parts commonly referred to as a side plate and a split peripheral rim. These two parts are designated by the reference numerals 10 and 11 respectively. In applying this cover to the tire 12 the ring-like side plate 10 is first placed on the tire and then the split rim 11 is mounted on the tire so as to embrace the tread thereof and to overlap the side plate 10 for the purpose of retaining it in proper position on the tire. In other words, the tire cover is self retained on the tire 12.

The beading strip 15 shown in Figures 1, 2, 3 and 4 may be made of any suitable material such for example as stainless steel of the non-hardened type. Strip 15, as will be observed from Figures 2 and 5, is of a convex cross section whereby its side edges are adapted to engage and bite into the outer surface of the rim member 11 as will clearly appear with the progress of the present description.

The two ends of the rim 11 are provided with transverse slots 16 and 17 designed to receive the ends of the beading strip 15 applied thereto.

In applying the beading strip 15 to the rim member one end of the strip is doubled back upon itself as shown in Figure 3 and around the corresponding end of the split rim 11 whereby the free end of the strip may be inserted through the slot 16 and under a portion of the strip on the outer periphery of the rim member as indicated at 18 in Figure 3.

Thereafter the strip is drawn taut and its other end is doubled back around the other end of the rim 11 as shown in Figure 4 and inserted through the slot 17 whereby the free portion of this end of the strip is also placed under a portion of the strip on the outer periphery of the rim as indicated at 19 in Figure 4.

Thereafter the natural elasticity of the beading strip 15 will cause it to pull away from its ends, thus causing its ends to be frictionally bound to the ends of the rim 11. In other words, in drawing or rolling the strip 15 taut to apply its second end to the rim as shown in Figure 4 the strip 15 is stretched and naturally the inherent elasticity of the material of the strip will thereafter tend to cause the strip to contract and thus bind the ends of the strip to the ends of the rim member.

In Figures 5 and 6 I have illustrated a modification of the invention in which a beading strip 15' of relatively heavy steel strip material is applied to the outer periphery of a rim member 11' similar to the rim 11.

According to this form of the invention, each end of the strip is doubled back over the corresponding end of the rim member 11' as indicated at 20 and is pressed into tight engagement with the under side of the rim at its extremities. The characteristics of the material comprising this strip 15' is such that after the ends of the strip are pressed into cooperation with the ends of the rim as shown at 20 the material will set and will thus firmly anchor the strip to the rim.

In Figure 7 I have illustrated still another modification of the invention in which the split rim 115 is provided with a convex circular rib 116 over which the convex beading strip 117 is disposed. The ends of this beading strip may be secured to the ends of the rim member 115 by either of the two methods previously described.

It should also be noted that each of the beading strips 15 and 15' is preformed so as to have a convex cross section. Also the strip 15' due to the relatively heavy material of which it is composed is preformed into a circular shape so as to enable it to be applied about the outer periphery of the rim member 11'.

The stainless steel strip 15 however does not require such circumferential preforming since it may be readily rolled about the outer periphery of the rim. Further this stainless steel strip 15 when in position has its side edges in tight contact with the outer surface of the rim 11 whereby these edges in effect bite into the surface of the rim.

The foregoing detailed description has been concerned principally with the preferred form of my invention illustrated in Figures 1 to 7 inclusive, whereas the description to hereinafter follow relates to the other principal form of my invention illustrated in Figures 8 to 13 inclusive.

In Figures 8 to 13 inclusive the numeral 1' indicates a metallic cover in the form of a split ring or rim. For the purpose of the present form of the invention, the ring or rim 1' is preliminarily punched at 2' adjacent its ends 3' to provide anchor portions 4'. A pair of cooperating male and female forming rolls 5' and 6' provided respectively with a circumferentially transversely arcuate rib 7' and groove 8' are rotated simultaneously. For a purpose to be hereinafter more fully explained the pitch diameter of the female roll 6' is somewhat less than that of the male roll 5'. The other parts are suitably constructed so that the surface speed of the female roll will be somewhat less than that of the male roll 5'. Rolls 5' and 6' may be suitably carried by shafts (not shown) for actuating the same.

The rolls 5' and 6' are arranged so that the cooperating rib and grooved portions 7' and 8' are separated by substantially the combined thickness of the rim member 1' and the molding or beading 16' to be secured thereto. The strip 16' is preferably of sheet metal of the general character used in steel tapes and the like and in passing between the rolls 5' and 6' is given an arcuate cross-sectional shape corresponding with that of the portions 7' and 8'.

The strip 16' when reaching the rolls 5' and 6' has preferably a fairly high degree of polish on its upper surface and may issue directly from a buffing machine or may be carried on a drum or bobbin (not shown). Whatever the source of supply may be, the strip 16' is guidingly conducted toward and substantially tangent to the rolls 5' and 6'.

In the application of the strip 16' to the rim member 1', the rim member 1' is placed in contact with and between the rolls 5' and 6' and the latter act to feed or draw the member 1' together with the strip 16' in the direction indicated by the arrow in Figure 13. This action of the rolls produces simultaneously a rib 21' in the member 1' and a transverse corresponding curvature in the strip 16' in embracing relation to the rib 21' and due to the fact that the female roll 6' drags or lags behind the male roll 5' the consequent tension insures a proper securing of the strip 16' over the rib 21'.

Upon completion of the forming operation, the rim 1' with the strip 16' applied thereto will have the appearance shown in Figures 9 and 13. It will be noted that the anchor portion 4' adjacent each end 3' of the rim 1' has been forced by the rolls to lie substantially flush with the portion from which it was initially struck and that it is disposed slightly below the extreme portions of the rib 21'. The free end of each portion 4' is jammed tightly against the adjacent portion of the strip 16' and the juxtaposed extremity of the end of the rim 21' is jammed against the adjacent portion 37' of the strip 16'.

The ends of the strip 16' are thus permanently and firmly united with the rib 21' and covers the intermediate portion of the same completely. The strip 16' is preferably fairly thin, compared to the material of which the rim member 1' is made, and when the strip is in position its outer surface is substantially flush with that of the cover rim 1 as shown at 36 in Figure 13.

This manner of securing the beading strip 16' to the cover member is decidedly advantageous in that it not only provides a simple anchor for each of the ends of the beading strip, but in addition thereto enables the strip to be maintained taut between its anchored ends.

Now I desire it understood that although I have illustrated and described in detail several embodiments of my invention, the invention is not to be thus limited, but only insofar as defined by the scope and spirit of the appended claims.

I claim as my invention:

1. The combination with a tire cover comprising a split circular rim member having a slot, of an elastic beading strip extending about the outer periphery of said rim member and having each of its ends turned back over an end of said rim and onto the under side of the rim and there inserted into said slot in said rim member and extended between and tightly engaged with a portion of the strip and the outer periphery of the rim member whereby said end of the beading is frictionally secured to the end of the rim by the elasticity of the material in said beading strip.

2. A tire cover member having ends and a transversely arcuate outwardly convex rib extending substantially throughout its length and having openings adjacent its ends, and a strip of molding overlying said rib between said openings, the ends of said strip being inserted through said openings, and means adjacent said openings and tightly engaging said strip and securing said strip therein.

3. A tire cover member having ends and a transversely arcuate rib extending substantially throughout its length and having openings adjacent its ends, a strip of molding overlying said rib between said openings and extending through said openings to underlie and be shielded by the remaining exposed end portions of the rib, and means anchoring the strip to the ends of the rib.

4. A tire cover member having ends and a transversely arcuate rib extending substantially throughout its length and having openings adjacent its ends, and a strip of molding secured to said member and overlying said rib between said openings and underlying the remaining end portions of the rib, the outer surface of said strip being flush with the end portions of said rib.

5. A tire cover member having a rib extending substantially throughout its length, struck out tongues adjacent the ends of the rib, and a strip of molding having its ends extending between said tongues and the adjacent end portions of the rib and having its intermediate portion overlying the intermediate portion of the rib, said tongues forcibly engaging said ends of the strip and thereby holding the same in position.

6. As an article of manufacture, a tire cover including an expansible and contractible resilient split tread covering part and a resilient beading strip extending about the outer periphery of said split part, and having each of its ends bent through a slot in said split part and tightly pressed between and thereby frictionally bound to edges of said slot to secure the beading strip to said part.

7. As an article of manufacture, a tire cover including an expansible and contractible resilient split tread covering part and a resilient beading strip extending about the outer periphery of said split part, and having each of its ends bent through a slot in said split part and tightly pressed between and thereby frictionally bound to edges of said slot to secure the beading strip to said part, said ends of the beading strip being thus self secured to the split part without requiring the use of any additional fastening means.

8. As an article of manufacture, a tire cover including an expansible and contractible resilient split tread covering part and a resilient beading strip extending about the outer periphery of said split part, and having each of its ends bent through a slot in said split part and tightly pressed between and thereby frictionally bound to edges of said slot to secure the beading strip to said part, both said split part and said strip being transversely curved and outwardly convex.

9. A tire cover member having a rib extending therealong, portions of the rib being partially severed, leaving openings, a beading strip having its ends extending through said openings and having its intermediate part overlying said rib, said portions forcibly biting said ends and thereby holding the same in position.

10. A tire cover part having a portion partially severed therefrom, leaving an opening, a beading strip overlying said part, and means securing one end of the strip to said part, the other end of the strip extending through said opening, said portion forcibly biting said other end and thereby securing the same in position.

11. A tire cover member having a rib extending therealong, portions of the rib being partially severed, leaving openings, a beading strip having its ends extending through said openings and having its intermediate part overlying said rib, said portions forcibly biting said ends and thereby holding the same in position, the outer surfaces of said portions being flush with the outer surface of said strip.

12. As an article of manufacture, a tire cover including a tread covering part and a beading strip extending about the outer periphery of said part and having each of its ends bent through a slot in said part and tightly pressed between and thereby frictionally bound to edges of said slot to secure the beading strip to said part.

13. As an article of manufacture, a tire cover including a tread covering part and a beading strip extending about the outer periphery of said part and having each of its ends bent through a slot in said part and tightly pressed between and thereby frictionally bound to edges of said slot to secure the beading strip to said part, said ends of the beading strip being thus self-secured to the part without requiring the use of any additional fastening means.

14. As an article of manufacture, a tire cover including a tread covering part and a beading strip extending about the outer periphery of said part and having each of its ends bent through a slot in said part and tightly pressed between and thereby frictionally bound to edges of said slot to secure the beading strip to said part, both said part and said strip being transversely curved and outwardly convex.

15. As an article of manufacture, a spare tire cover member having a bowed rib-like portion and a discontinuous strip of molding transversely bowed to fit over the bowed portion of the cover member and of such curvature that its edges are pressed into tight frictional engagement with the bowed portion of the cover member to frictionally bind it to the cover member, said cover member being slotted to provide portions about which the ends of said discontinuous strip are looped to secure the strip to the cover member.

16. As an article of manufacture, an arcuate spare tire cover member having portions spaced from each other and from the remainder of the member, said portions providing anchors to facilitate securement thereto of the ends of a strip of molding and a strip of molding having its ends secured in place by said portions.

17. As an article of manufacture, a spare tire cover member and a discontinuous strip of molding transversely bowed and fitting over the cover member and of such curvature that its edges are pressed into tight frictional engagement with the cover member to frictionally bind it to the cover member, said cover member being slotted to provide a portion about which an end of said strip is looped to secure said end to the cover member, and means securing the other end of the strip to the cover member.

18. As an article of manufacture, a spare tire cover member and a discontinuous strip of molding transversely bowed and fitting over the cover member and of such curvature that its edges are pressed into tight frictional engagement with the cover member to frictionally bind it to the cover member, said cover member being slotted to provide portions between which an end of the strip is frictionally bound to secure said end to the cover member, and means securing the other end of the strip to the cover member.

19. As an article of manufacture, an arcuate spare tire cover having a portion spaced from the remainder of the member, said portion providing an anchor to facilitate securement thereto of an end of a strip of molding and a strip of molding having an end secured in place by said portion.

GEORGE ALBERT LYON.